United States Patent
Au et al.

(10) Patent No.: US 8,755,997 B2
(45) Date of Patent: Jun. 17, 2014

(54) LASER RANGING PROCESS FOR ROAD AND OBSTACLE DETECTION IN NAVIGATING AN AUTONOMOUS VEHICLE

(75) Inventors: Kwong Wing Au, Bloomington, MN (US); Jon Schewe, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 1226 days.

(21) Appl. No.: 12/182,774

(22) Filed: Jul. 30, 2008

(65) Prior Publication Data
US 2010/0030473 A1  Feb. 4, 2010

(51) Int. Cl.
G06K 9/00 (2006.01)

(52) U.S. Cl.
CPC .................. G06K 9/00791 (2013.01)
USPC ............. 701/301; 701/300; 701/26; 700/255; 703/1

(58) Field of Classification Search
CPC .................................. G06K 9/00791
USPC ............... 701/26, 300; 700/255; 703/1
See application file for complete search history.

(56) References Cited

U.S. PATENT DOCUMENTS

| | | | |
|---|---|---|---|
| 4,740,085 A | 4/1988 | Lim | |
| 5,050,423 A | 9/1991 | Czarnocki | |
| 5,367,898 A | 11/1994 | Matsuzaki | |
| 5,525,882 A | 6/1996 | Asaka et al. | |
| 5,956,250 A * | 9/1999 | Gudat et al. | 701/26 |
| 5,999,866 A | 12/1999 | Kelly et al. | |
| 6,002,983 A | 12/1999 | Alland et al. | |
| 6,298,288 B1 | 10/2001 | Li et al. | |
| 6,374,191 B1 | 4/2002 | Tsuchiya et al. | |
| 6,615,117 B2 | 9/2003 | Li et al. | |
| 6,679,702 B1 | 1/2004 | Rau | |
| 6,728,608 B2 | 4/2004 | Ollis et al. | |

(Continued)

FOREIGN PATENT DOCUMENTS

WO  2008068542  6/2008

OTHER PUBLICATIONS

A new method for quadratic curve detection using K-Ransac with acceleration techniques; Yu Chin Cheng and Samuel C. Lee; School of computer science and school of electrical engineering, University of Oklahoma; Pattern Recognition, vol. 28, No. 5, pp. 663-682; 1995.*
Identifying quadric surfaces; Davidson.edu; Tim Chartier.*

(Continued)

*Primary Examiner* — Dilek B Cobanoglu
(74) *Attorney, Agent, or Firm* — Fogg & Powers LLC

(57) ABSTRACT

A method and system provide road and obstacle detection in navigating an autonomous vehicle. The method comprises scanning a distance ahead of the autonomous vehicle to obtain a current range scan, and obtaining navigation data, including dynamics, position, and orientation measurements of the autonomous vehicle. The current range scan is transformed to world coordinates with respect to a reference location based on the navigation data, and the transformed current range scan is input into a distance-based accumulator. The transformed current range scan is added to a variable size buffer when the autonomous vehicle is deemed to be non-stationary. A ground plane is estimated from the transformed current range scan and prior range scans stored in the variable size buffer. The estimated ground plane is represented as a constrained quadratic surface, which is classified into one or more of a traversable area, a non-traversable area, or an obstacle area for navigation of the autonomous vehicle.

20 Claims, 7 Drawing Sheets

(56) References Cited

U.S. PATENT DOCUMENTS

| | | | |
|---|---|---|---|
| 6,754,370 | B1 | 6/2004 | Hall-Holt et al. |
| 6,778,924 | B2 | 8/2004 | Hanse |
| 6,823,261 | B2 | 11/2004 | Sekiguchi |
| 6,968,281 | B2 | 11/2005 | Hanse |
| 7,272,474 | B1 | 9/2007 | Stentz et al. |
| 7,437,244 | B2 * | 10/2008 | Okada ............ 701/301 |
| 7,643,966 | B2 * | 1/2010 | Adachi et al. ............ 703/1 |
| 7,742,841 | B2 * | 6/2010 | Sakai et al. ............ 700/255 |
| 7,995,055 | B1 * | 8/2011 | Ma et al. ............ 345/420 |
| 8,325,979 | B2 * | 12/2012 | Taborowski et al. ............ 382/103 |
| 8,446,468 | B1 * | 5/2013 | Medioni et al. ............ 348/144 |
| 2003/0016161 | A1 | 1/2003 | Okai et al. |
| 2005/0024492 | A1 | 2/2005 | Schaefer et al. |
| 2005/0278098 | A1 * | 12/2005 | Breed ............ 701/45 |
| 2007/0219720 | A1 * | 9/2007 | Trepagnier et al. ............ 701/300 |
| 2008/0046150 | A1 | 2/2008 | Breed |
| 2008/0223107 | A1 | 9/2008 | Stewart |
| 2010/0106356 | A1 | 4/2010 | Trepagnier et al. |

OTHER PUBLICATIONS

McBride, James Ph.D., "Darpa Urban Challenge, Intelligent Vehicle Systems Technical Paper", Apr. 13, 2007, Published in: Dearborn, MI.

Fischler et al., "Random Sample Consensus: A Paradigm for Model Fitting With Applications to Image Analysis and Automated Cartography", "Communications of the ACM", Jun. 1981, pp. 381-395, vol. 24, No. 6, Publisher: ACM.

Campbell et al., "Flash-Ladar Intertial Navigator Aiding", "IEEE Position, Location, and Navigation Symposium", 2006, pp. 677-683, Publisher: IEEE.

Jenkins, Bruce, "Laser Scanning: Darpa Urban Challenge", "The American Surveyor Magazine", Feb. 14, 2008, Publisher: Cheves Media.

Batavia et al., "Autonomous Coverage Operations in Semi-Structured Outdoor Environments", "Robotics Institute"Publisher: Carnegie Mellon University, Published in: Pittsburgh.

Fardi et al., "Hough Transformation Based Approach for Road Border Detection in Infrared Images", "IEEE Intelligent Vehicles Symposium", Jun. 14-17, 2004, Publisher: IEEE.

Latecki et al., "New EM Derived from Kullback-Leibler Divergance", "ACM SIGKDD International Conference on Knowledge Discovery and Data Mining", Aug. 2006, Publisher: ACM SIGKDD, Published in: Philadelphia.

U.S. Patent and Trademark Office, "Advisory Action", "U.S. Appl. No. 12/261,683", Jun. 15, 2012, pp. 1-2.

U.S. Patent and Trademark Office, "Final Office Action", "U.S. Appl. No. 12/261,683", Mar. 29, 2012, pp. 1-16.

U.S. Patent and Trademark Office, "Notice of Allowance", "U.S. Appl. No. 12/261,683", Nov. 9, 2012, pp. 1-7.

U.S. Patent and Trademark Office, "Office Action", "U.S. Appl. No. 12/261,683", Sep. 26, 2011, pp. 1-14.

* cited by examiner

LASER RANGING PROCESS FOR ROAD AND OBSTACLE DETECTION IN NAVIGATING AN AUTONOMOUS VEHICLE

GOVERNMENT LICENSE RIGHTS

The U.S. Government may have certain rights in the present invention as provided for by the terms of contract number HR0011-06-9-0011 with DARPA.

BACKGROUND

Unmanned ground vehicles (UGVs) include remote-driven or self-driven land vehicles that can carry cameras, sensors, communications equipment, or other payloads. Self-driven or "autonomous" land vehicles are essentially robotic platforms that are capable of operating outdoors and over a wide variety of terrain.

Autonomous land vehicles can travel at various speeds under diverse road constructs. For example, an autonomous land vehicle can travel at the speed limit when traffic is sparse, at low speed during a traffic jam, or can stop at a traffic light. The autonomous land vehicle can also travel at a constant speed, as well as accelerate or decelerate. The road on which the vehicle traverses can be straight, curved, uphill, downhill, or have many undulations. The number of lanes on the road can vary, and there are numerous types of road side constructs such as curbs, lawns, ditches, or pavement. Objects on and off the road such as cars, cycles, and pedestrians add more complexity to the scenario. It is important to accurately classify these road elements in order that the vehicle can navigate safely.

In one navigation system for autonomous land vehicles, a laser detection and ranging (LADAR) sensor is used to measure the range to each point within a scan that sweeps across a horizontal line. On-board global positioning system (GPS) and inertial navigation system (INS) sensors provide the geo-location and dynamics of the vehicle, which includes the position and altitude of the vehicle in world coordinates, as well as the velocity and angular velocity of the vehicle. This navigation system for autonomous land vehicles often has difficulty in processing the LADAR data and combining the GPS/INS data to accurately classify each range measurement in a scan into one of traversable, non-traversable, lane-mark, and obstacle classes. Classification of the range measurements based only on one input scan and its corresponding GPS/INS input is not robust enough with the diversity of vehicle states and road configurations that can be encountered.

An alternate navigation system classifies each range measurement in a scan based on the history of recent range scans. A fixed-size history buffer is employed having a size based on a fixed number of range scans. Consequently, the distance covered by the range scans saved in this buffer depends on the speed of the vehicle. When the vehicle travels at high speed, the area coverage in a fixed number of scans is large. When the vehicle travels at slow speed, the area coverage is small. Using the scans in the fixed-size buffer for ground plane estimation causes varying degrees of inaccuracy.

SUMMARY

The present invention includes a method and system that provide road and obstacle detection in navigating an autonomous vehicle. The method comprises scanning and storing range scans of a fixed size area ahead of the autonomous vehicle, such as with a laser scanner, and obtaining a current range scan and its associated navigation data including dynamics, position, and orientation measurements of the autonomous vehicle. The current range scan is transformed to world coordinates with respect to a reference location based on the navigation data, and when the autonomous vehicle is deemed to be non-stationary, the transformed current range scan is input into a distance-based accumulator, which has a variable size buffer. A ground plane is estimated from the transformed current range scan and prior range scans stored in the variable size buffer. The estimated ground plane is represented as a constrained quadratic surface, based on which the input range scan is classified into one or more of a traversable area, a non-traversable area, or an obstacle area for navigation of the autonomous vehicle.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
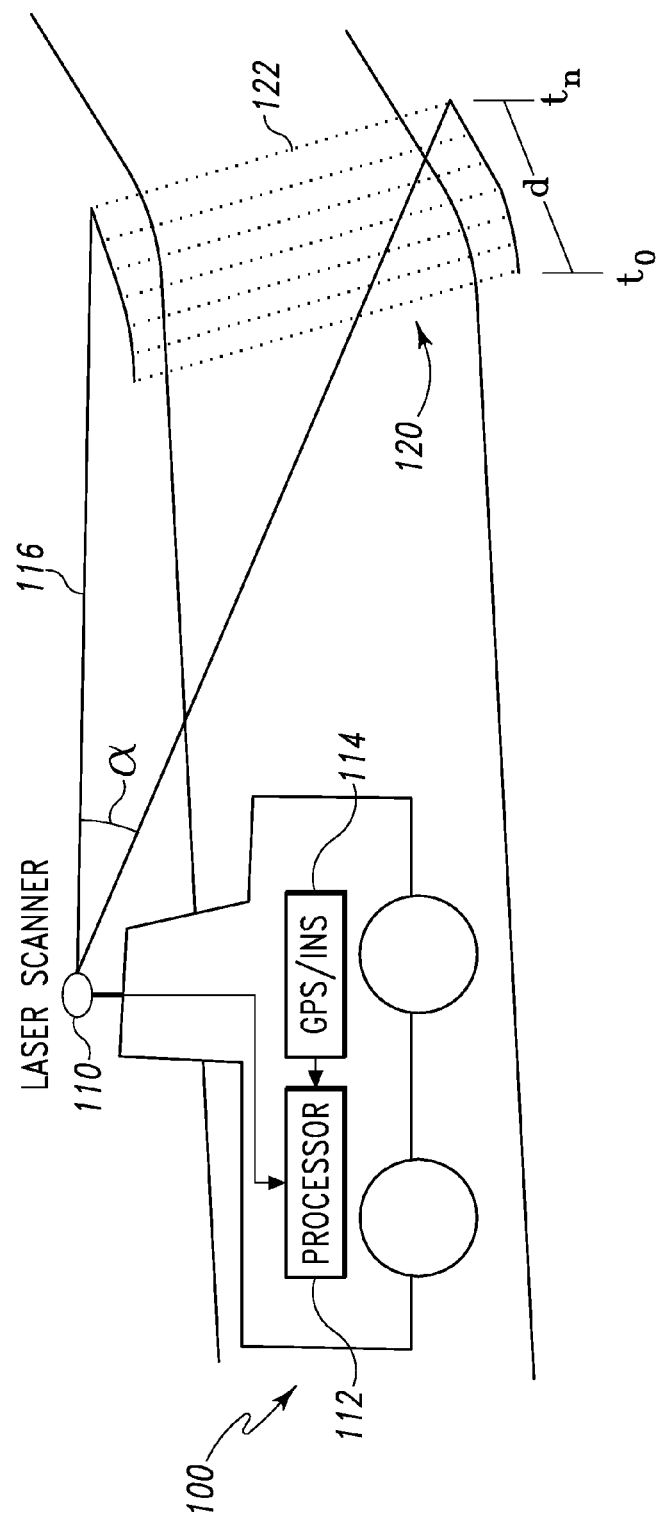
FIG. 1 illustrates a laser scanning system in an autonomous land vehicle according to one embodiment.

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a method and system that apply a laser range processing technique for road and obstacle detection in navigating an autonomous vehicle through varied terrain. The information obtained and used by the present laser range processing technique can be employed to build a world map of what is around the autonomous vehicle to help the vehicle successfully navigate.

In order to implement a plan for reaching a destination safely, an automonous vehicle such as an automonous land vehicle must know the locations of the roads, the markings on the roads, and any obstacles ahead. One instrument that can be used to acquire this information is a laser scanner such as a laser ranging scanner, which scans a beam across the ground ahead of the vehicle in a back and forth sweeping motion. The scanning rate can be variable, and every scanner sweep once across the ground produces data to be processed. The range measurements from one scanner sweep are referred to herein as a "range scan."

The present technique processes range scan data, which can be acquired by one or more laser scanners, with navigation data to provide a situation awareness, which includes the detection of traversable areas, non-traversable areas, or obstacles. Traversable areas include, for example, roads, large flat areas, and the like. Non-traversable areas include, for example, road curbs, pedestrian walkways, steep slopes, and the like. Obstacles include objects of a certain size and height that a vehicle cannot traverse over, such as other vehicles, pedestrians, and the like. This situation awareness allows the autonomous vehicle to plan a route for safe navigation to a desired destination.

The present method estimates a ground plane from a history of range scan measurements that are cumulated from recent range scans. Many conventional approaches represent the ground plane with a plane surface. A road is often not planar, especially where a turn transitions into uphill or downhill. The technique of the invention models the road as a quadratic surface with restricted curvature. Hence, the present ground plane estimation fits the road measurements into a quadratic surface that has a small curvature.

The present method and system employ a variable size history buffer, in which the buffer memory can hold a variable number of range scans, with the range scans being acquired for a fixed distance at a particular scan angle. Thus, the number of range scans is not fixed, rather only the distance covered by the range scans is fixed. The amount of memory used in the history buffer is based on the fixed distance covered at a minimum number of range scans. In contrast, standard techniques store a fixed number of scans in a fixed size buffer.

The fixed distance of the range scans used in the present method can be predetermined based on the intended environment where the autonomous vehicle will operate. When an autonomous vehicle is moving, a fixed distance coverage area based on the range scans is saved in the history buffer. When the autonomous vehicle is stationary, range measurements are not added to the history buffer. This allows for a much more consistent estimation of the ground plane based on the fixed size area, regardless of the vehicle speed, and consequently a more accurate classification of heights of objects in the path of the vehicle. If data accumulated in the history buffer results in a variation from the predetermined fixed distance, older data is removed from the buffer so that the fixed distance can be maintained. For example, when range measurements from an input range scan are updated into the history buffer, any data outliers present in the history buffer are eliminated during each update.

The method of the invention can be implemented in software, firmware, or embedded in application specific hardware. Various implementations of the present invention are described in further detail hereafter with respect to the drawings.

FIG. 1 illustrates one embodiment of a laser scanning system in an autonomous land vehicle 100 for road and obstacle detection in navigating vehicle 100. The laser scanning system includes at least one laser scanner 110 mounted on vehicle 100. The laser scanner 110 is configured to scan the land ahead of vehicle 100 in a sweeping pattern, and measure ranges and intensities in a scan region 120, with a fixed size area, ahead of vehicle 100. The fixed size area is based on a fixed distance d and a scan angle a. In one embodiment, the laser scanner 110 can include at least one light detection and ranging (LIDAR) device.

The laser scanner 110 is operatively coupled to a processing unit 112 in vehicle 110. The processing unit 112 can be a computer, a digital signal processor (DSP), or a field programmable gate array (FPGA), which form part of the laser scanning system. The processing unit includes a variable size buffer, which is discussed in further detail hereafter.

An on-board navigation unit 114 in vehicle 100 is also operatively coupled to processing unit 112. The navigation unit 114 can be used to accurately determine a position of vehicle 100, and can include one or more global positioning system (GPS) sensors, and one or more inertial navigation system (INS) sensors such as one or more inertial measurement units (IMUs). The GPS and INS sensors provide data related to the geo-locations and dynamics of vehicle 100. Such data is used to determine the position and altitude of vehicle 100 in world coordinates, and the velocity and angular velocity of vehicle 100.

As vehicle 100 is traveling, laser scanner 110 sweeps a beam 116 across a line segment 122 of scan region 120 and measures ranges at discrete points along line segment 122. As discussed further hereafter, processing unit 114 synchronizes range scan inputs from laser scanner 110 and from navigation unit 114, classifies the range scans, and transforms the classification results into world coordinates.

Figure 2A:
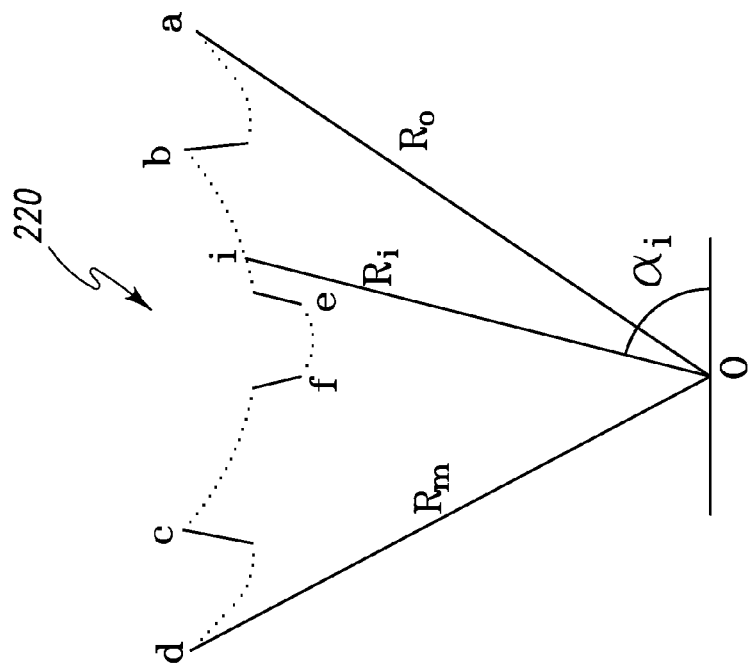
FIGS. 2A and 2B show exemplary laser range scans for an autonomous land vehicle traveling on a road.
Figure 2B:
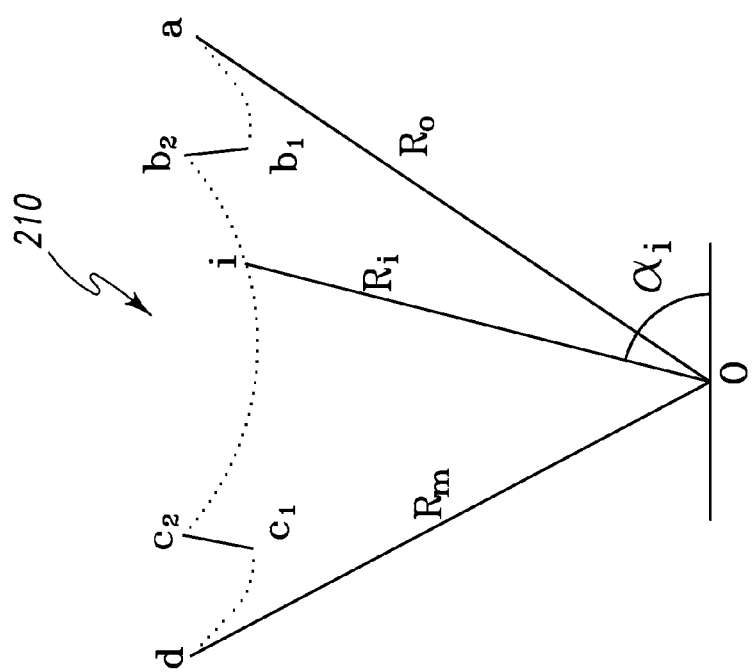

Exemplary range scans for an autonomous land vehicle traveling on a road are shown in the diagrams of FIGS. 2A and 2B. FIG. 2A depicts a first range scan 210 along the road, in which the segments $a$-$b_1$ and $c_1$-$d$ represent a sidewalk on either side of the road, segments $b_1$-$b_2$ and $c_1$-$c_2$ represent a curb adjacent to each sidewalk, and the middle segment $b_2$-$c_2$ represents the road. FIG. 2B depicts a second range scan 220 further along the road, in which the segment e-f, in between the segment b-c, represents an obstacle such as a car on the road in front of the autonomous land vehicle. In FIGS. 2A and 2B, the beam lines $R_0$, $R_i$, and $R_m$, extending from an origin O for each of range scans 210 and 220, represent the distances (ranges) from the laser scanner to the points a, i, and d. The angle $\alpha_i$ is the azimuth angle of the line O-i with respect to the laser scanner reference.

Due to noise in the range measurements, as well as the configuration and condition of roads and sidewalks, classification of traversable and non-traversable areas based on only one range scan is not reliable and robust. Accordingly, the method of the invention builds a three-dimensional road model from cumulated range scans, which are gathered by the laser scanner, and from geo-locations, which are obtained from the navigation unit. This three-dimensional road model, which represents a ground plane, is formulated as a constrained quadratic surface. The inputted range scan data, after being transformed into world coordinate points of the three-dimensional road model, can then be correctly classified based on heights above the ground plane.

Figure 3:
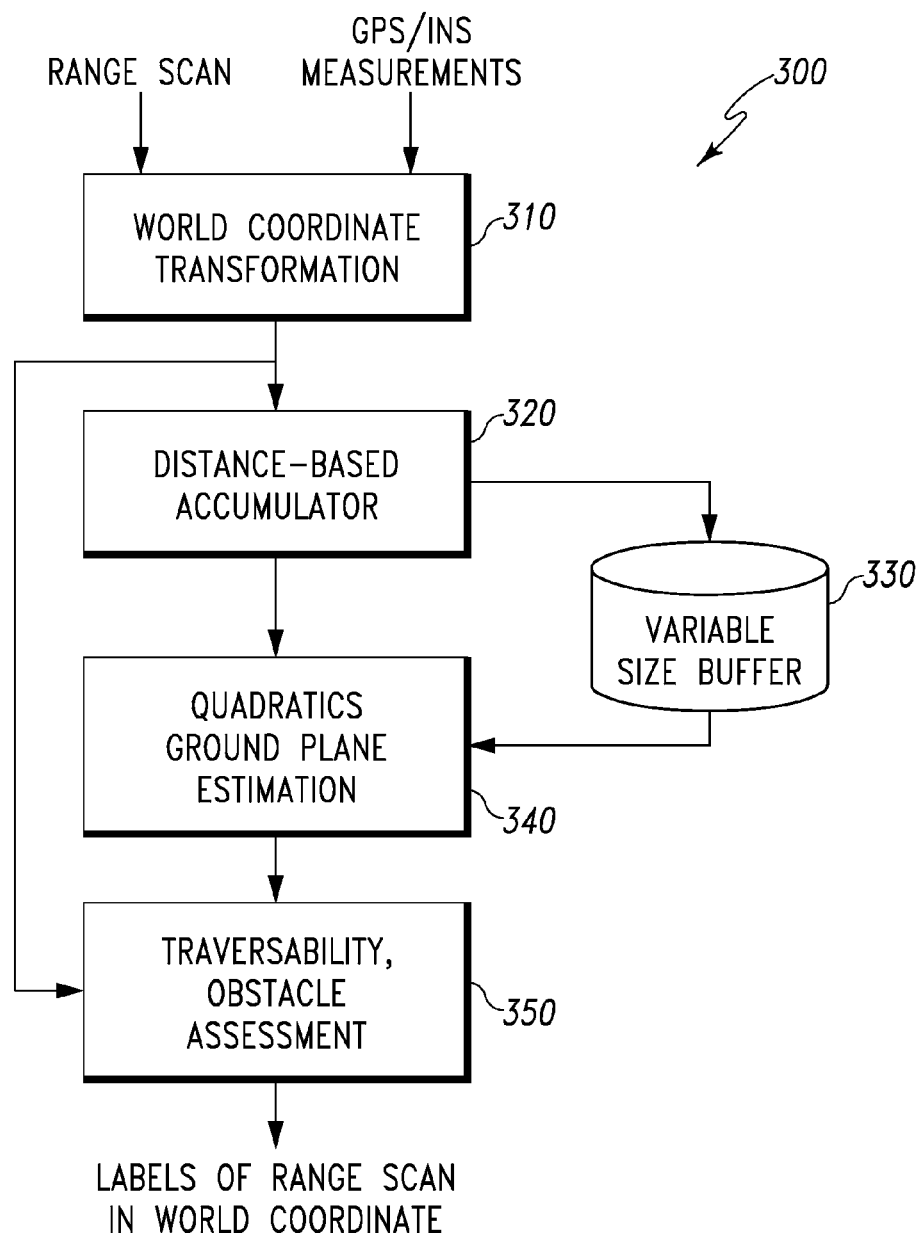
FIG. 3 is a functional block diagram showing a laser ranging process according to the present invention for road and obstacle detection in navigating an autonomous land vehicle.

FIG. 3 is a functional block diagram showing a laser ranging process 300 according to the present invention for road and obstacle detection. Initially, range scans and GPS/INS measurements are input into a World Coordinate Transformation (WCT) unit 310, which is configured to combine the range measurement data with the navigation data to determine a coordinate transformation. The WCT unit 310 transforms the range measurements in a range scan, which are recorded as the azimuth angles and ranges with respect to a location of the laser scanner, to Universal Transverse Mercator (UTM) world coordinate data with respect to a reference location, e.g., the starting point of the route. This transformation is a standard technique given the vehicle's UTM coordinate, a lever arm from the navigation unit to the laser scanner, and the range scan measurements.

A distance-based accumulator 320 is configured to receive the world coordinate data from WCT unit 310. The accumulator 320 assembles the range scans into a variable size buffer 330 based on a specified fixed distance, which is a variable parameter depending on the expected road type. For example, a smooth road type dictates a shorter fixed distance while a rough and irregular road type requires a longer fixed distance.

The variable size buffer 330 saves a fixed distance coverage area of the range scans regardless of the speed of the vehicle. For example, as shown in FIG. 1, the distance covered, d, is kept fixed for the range scans that are saved in the buffer. The time for scanning ($t_0$ to $t_n$) and the buffer size vary. The process performed by accumulator 320 is described hereafter in further detail with respect to FIG. 4.

Data from distance-based accumulator 320 and the variable size buffer 330 is fed into a quadratic ground plane estimator 340, which estimates a ground plane from a history of road measurements that are cumulated from previous range measurement scans. The ground plane estimation fits the road measurements into a quadratic surface with a restricted curvature. The range measurements sometimes can be noisy, and measurements other than that from the road may be added into the ground plane estimation as data outliers. Standard best fit methods, such as least square fit, often yield a biased estimate due to the presence of the outliers. Thus, the ground plane estimator 340 utilizes a modified RANSAC (RANdom SAmple Consensus) process, which is immune to outliers, to estimate the ground plane quadratic surface. The process performed by ground plane estimator 340 is described hereafter in further detail with respect to FIGS. 5-7.

Data generated by the ground plane estimator 340 is input into a traversability/obstacle assessment module 350, which also is configured to receive input range scan data transformed to UTM coordinates. The assessment module 350 classifies the range scan data into traversable, non-traversable, and obstacle areas. The heights of the range scan measurements from the estimated ground plane are computed and compared with predetermined height thresholds, such as a curb threshold and an obstacle threshold. For example, heights below the curb threshold are classified as traversable such as for a road, heights above the obstacle threshold are classified as obstacles and thus non-traversable, and heights in between the two thresholds are classified as non-traversable such as for a curb. The height thresholds can be varied depending on the size and type of vehicle. For example, heights in between a curb threshold and an obstacle threshold can be classified as traversable when the vehicle is large enough. The height thresholds can also be ignored if necessary to avoid an obstacle (e.g., drive over a curb to avoid a pedestrian).

Once the range scan measurements are classified into traversable, non-traversable, or obstacle areas for the autonomous vehicle, the range scan measurements are labeled in world coordinates and output to a path planner to determine a route for navigating the autonomous vehicle.

Figure 4:
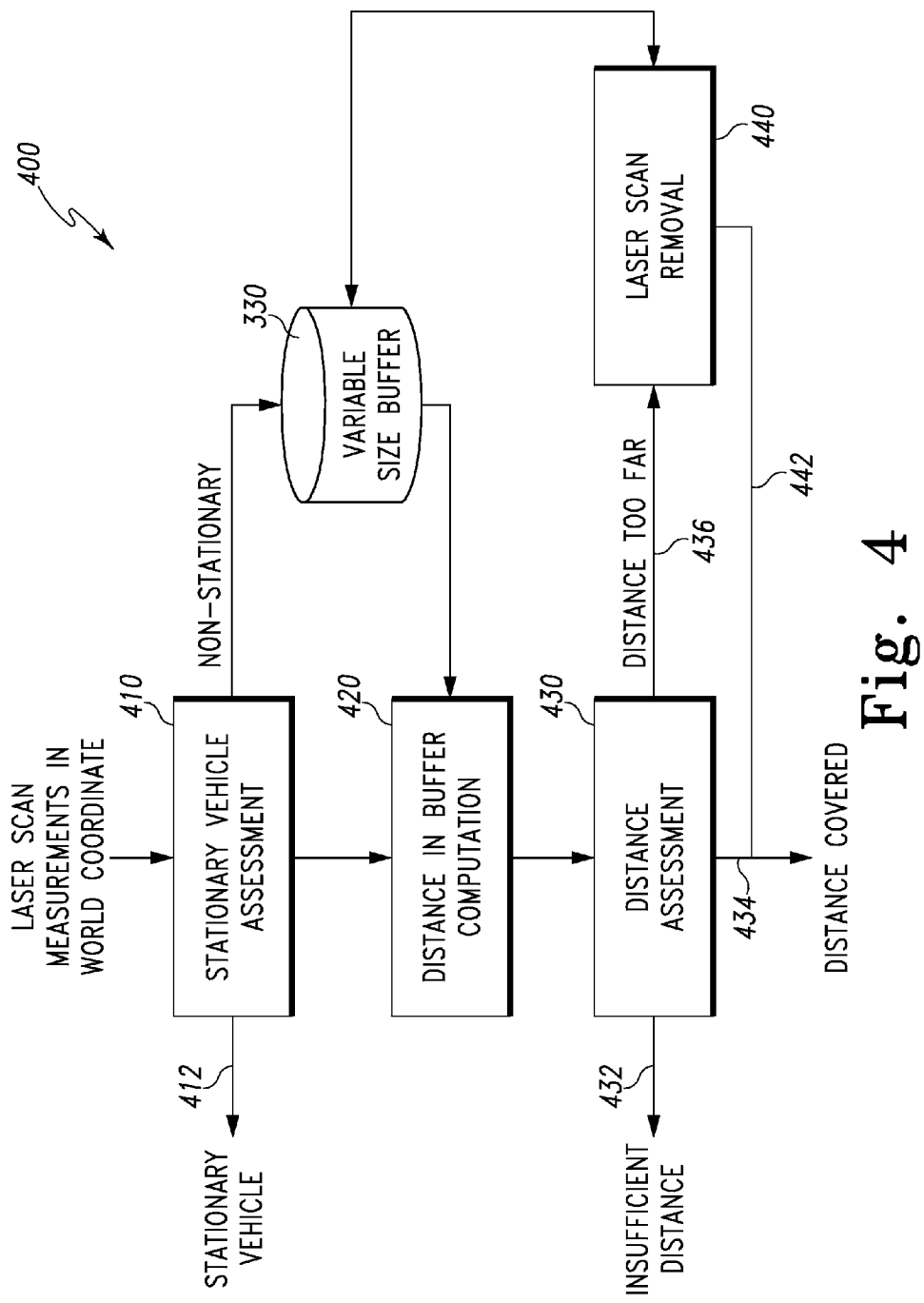
FIG. 4 is a functional block diagram depicting a fixed distance-based accumulator process for use in the laser ranging process of FIG. 3.

Turning to FIG. 4, a process 400 performed by the distance-based accumulator is depicted in further detail. Range scan measurements in world coordinates are received by a stationary vehicle assessment module 410, which determines whether the vehicle is stationary or moving, by comparing a current range scan with an immediately preceding range scan stored in variable size buffer 330. These two range scans will be very similar when the vehicle is stationary. One method to measure the similarity is that a sum of the absolute difference between the two range scans is less than the measurement noise. Another embodiment in the determination of a stationary vehicle is based on the INS input, which provides the dynamics of the vehicle, such as the velocity and the positions of the vehicle. If the vehicle is stationary, a "stationary vehicle" signal 412 is returned and no change is made to buffer 330. In addition, no new information will be output to the path planner from this stationary range scan.

If the vehicle is deemed non-stationary, the current range scan is added to buffer 330, and the distance covered ($D_c$) by the range scans stored in buffer 330 is computed by a computation module 420. For each range scan, a position in world coordinates is computed. This position can be the first measurement of the range scan. In such a case, no additional computation and storage are required. In an alternate approach, the mean or median position of the measurement in each range scan is computed. The distance covered in the buffer, $D_c$, can then be computed as the L2 norm between the first and last range scans in the buffer.

A distance assessment module 430 compares a required fixed distance threshold, $D_{thrs}$, with the distance covered, $D_c$, in buffer 330. If $D_c$ is less than $D_{thrs}$, then an insufficient distance signal 432 is returned. If $D_c$ is approximately equal to $D_{thrs}$, then a distance covered signal 434 is returned. When $D_c$ is greater than $D_{thrs}$, a distance too far signal 436 is sent to a range scan removal module 440, which removes older range scans from buffer 330 until a new distance, $D'_c$, in buffer 330 is just larger than $D_{thrs}$. A distance covered signal 442 from range scan removal module 440 is then returned.

When buffer 330 has saved enough range scans that cover the required fixed distance, the quadratic ground plane estimator 340 (FIG. 3) generates a ground plane representation.

Most conventional ground plane representations are based on a planar formula:

$$z = Ax + By + C \qquad (1)$$

where
  z is the height of the plane,
  x and y are the locations at the horizontal axes, and
  A, B and C are constants.
The estimation process then computes the constants, A, B, and C, such that the range scan measurements in the buffer best fit a plane according to equation (1).

In reality, most roads are not constructed as plane surfaces, but rather as curved surfaces, such as for drainage purposes. This is particularly true at the transition from a level road to uphill or downhill. Thus, the present method represents the ground plane, which corresponds to the road surface, as a constrained quadratic surface defined by:

$$z = Ax^2 + By^2 + Cx + Dy + E \qquad (2)$$

where
  z is the height of the plane,
  x and y are the locations at the horizontal axes,
  A and B are constrained constants, and
  C, D and E are constants.

Figure 5:
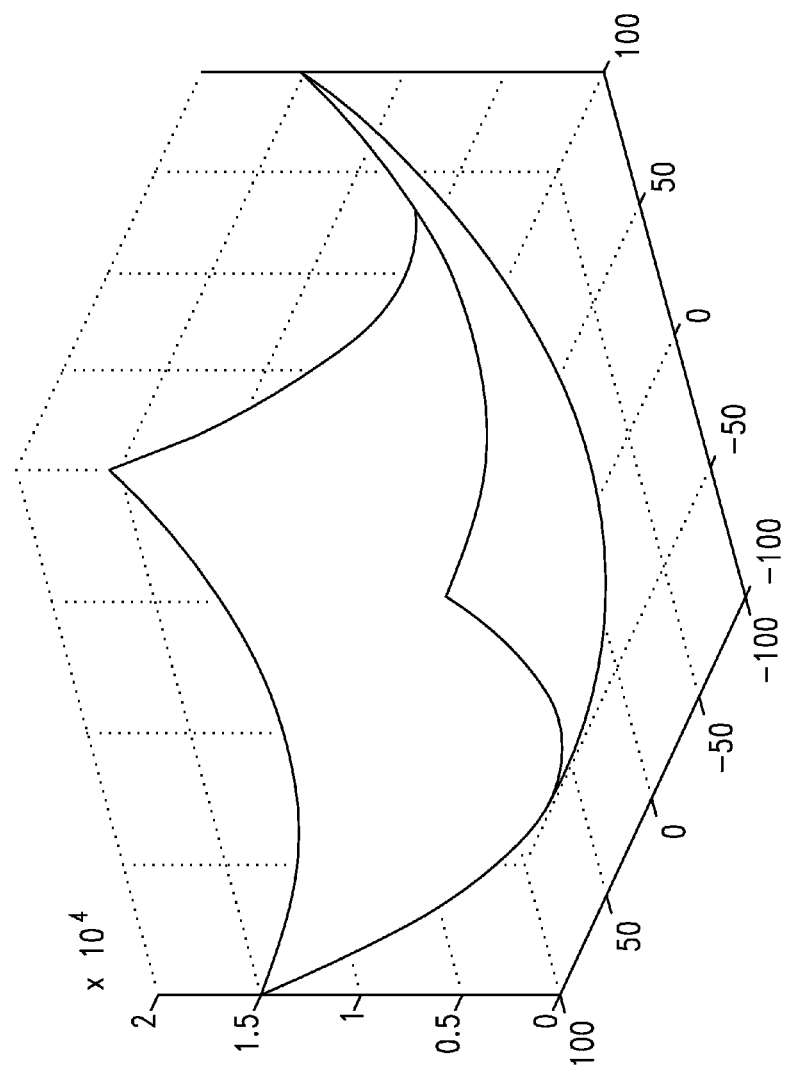
FIGS. 5-7 are three-dimensional graphical representations showing the shape and curvature of quadratic surfaces calculated by various parameter values indiciating the need for their constraint.
Figure 6:
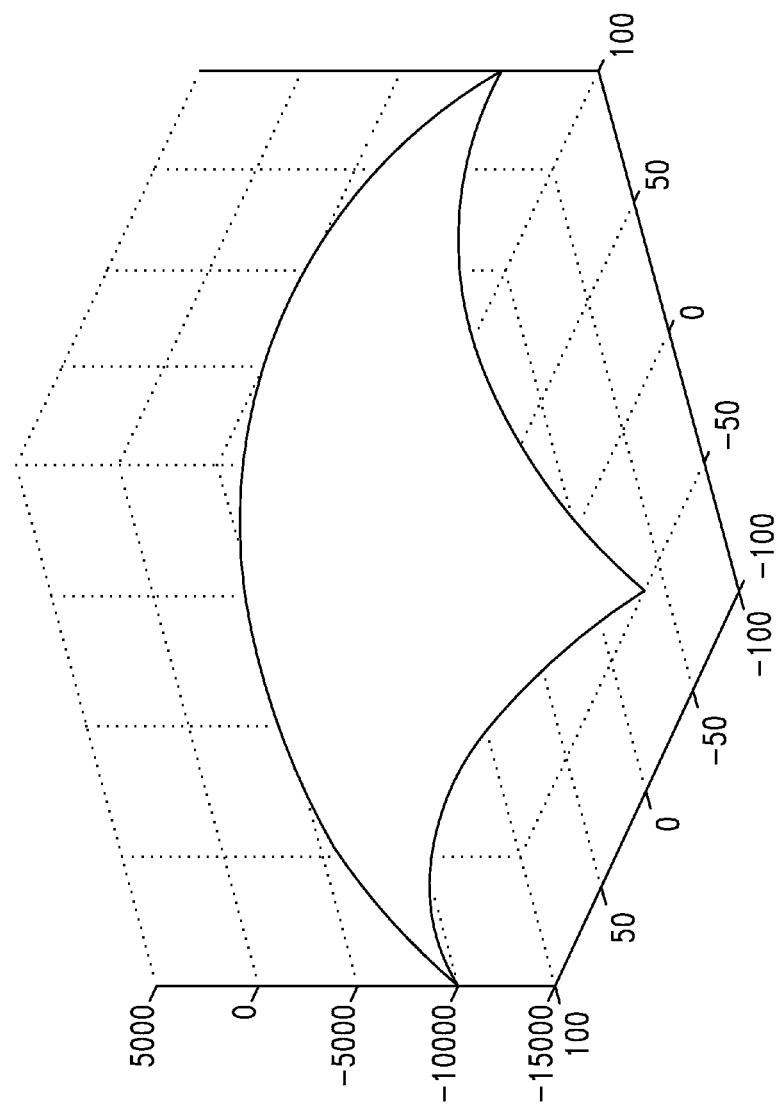
Figure 7:
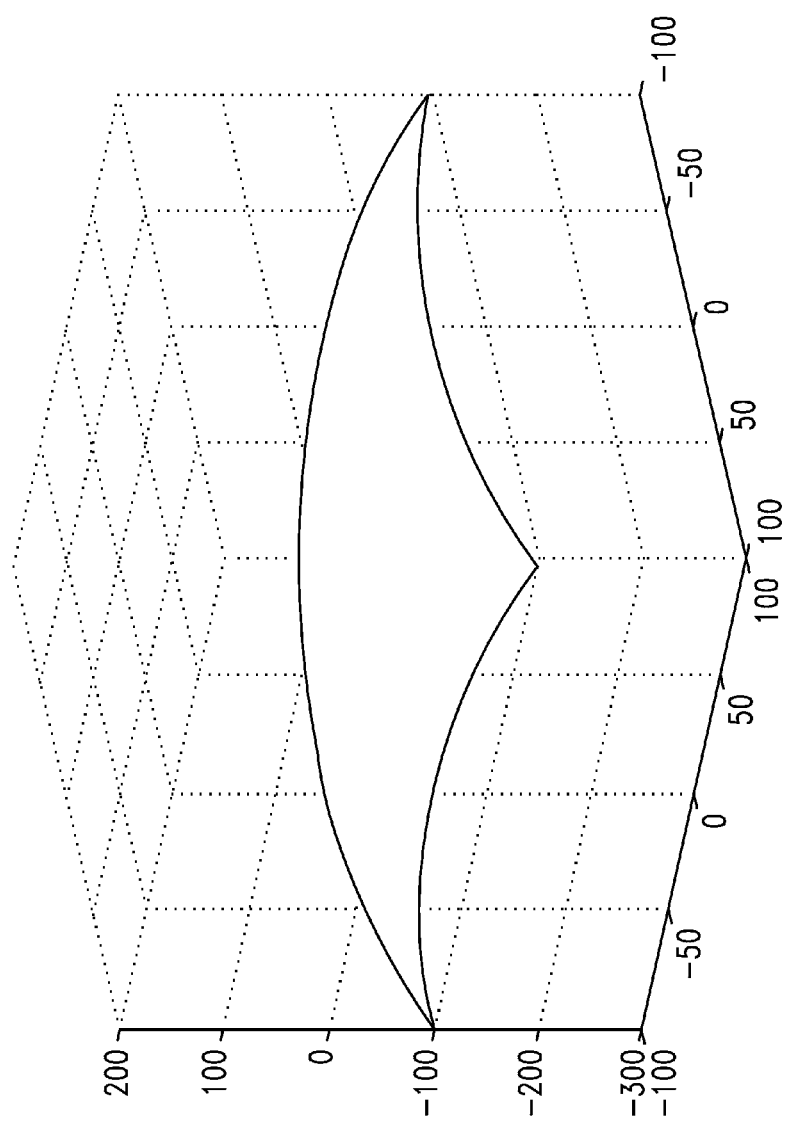

The constrained constants A and B can only have restricted values. The shape and curvature of the quadratic surface is mainly governed by these two constrained constants. FIGS. 5-7 are three-dimensional graphical representations showing the shape and curvature of quadratic surfaces. When constrained constants A and B are positive, the quadratic surface is concave, as shown in the diagram of FIG. 5. When constrained constants A and B are negative, the quadratic surface is convex, as shown in the diagram of FIG. 6. In addition, the curvature of the quadratic surface can also be determined by the values of constrained constants A and B, as shown in the diagram of FIG. 7. In general, a road is not concave and obviously, a road does not resemble FIGS. 5 and 6 because of their high curvatures. Hence, the values of A and B must be constrained in order to properly represent a road surface.

As most roads are designed for vehicle transportation, the values of constrained constants A and B will be confined to a range of values, during the ground plane estimation process. The range of values for A and B can be determined based on the types and construct of the road, such as the number of lanes, straight or curved road, etc. Without the knowledge of the expected road type and construct, one can restrict the values of constrained constants A and B to be small.

As mentioned previously, the ground plane estimator utilizes a modified RANSAC process. Laser measurements are typically noisy, e.g., due to wetness, roughness, scatter, and irregular reflectance of the scanned surfaces, which can be a road, other vehicles, or a sidewalk. Many outliers that are not the elements of a road are measured and collected in the buffer. In this situation, the conventional least square fit method to estimate the quadratic ground plane does not work well. Hence, the method of the invention applies a modified RANSAC process.

The standard RANSAC process uses an iterative technique to estimate parameters of a mathematical model from a set of observed data. In each iteration, a randomly sampled population is selected from the entire population, which are the measurements of the range scans in the buffer. Then, using only the sampled population, a technique, such as least square fit, is used to estimate the quadratic ground plane (all the constants in equation 2). The error of the entire population as fitted into the estimated ground plane is computed. If the error is less than a predefined threshold or a maximum number of iterations is reached, the best ground plane estimate is outputted. If the error exceeds the threshold, the best ground plane estimate so far is kept and another iteration is exercised.

A basic assumption of the RANSAC process is that the data contains "inliers" which are data points that can be explained by some set of model parameters, and "outliers" which are data points that do not fit the model. The RANSAC process also assumes that, given a set of inliers, there exists a procedure which can estimate the parameters of a model that optimally explains or fits the data. Further details regarding the RANSAC process are in an article by M. A. Fischler, R. C. Bolles, "Random Sample Consensus: A Paradigm for Model Fitting with Applications to Image Analysis and Automated Cartography," *Comm. of the ACM* 24: 381-395 (June 1981), which is incorporated herein by reference.

The modified RANSAC process utilized in the present method changes two elements of the standard RANSAC process. The first change is to the definition of the best ground plane estimate. In most standard approaches, the best ground plane estimate is the one that has the minimum error. In the present approach, the definition of the best ground plane estimate is the one that has the minimum error and for which the constrained constant criterion is met. The second changed element is the sampling process. The entire population (all range scans) is divided into n number of bins, with each bin having range scans that cover approximately equal distance traveled. Then, range scans from each bin are randomly sampled to form the sample space for the least square fit. This sampling technique assures that the measurements are obtained from the full spectrum of the buffer for each iteration of the RANSAC process.

Even though the standard RANSAC process, by its random sampling nature, eventually can arrive at a similar sampling coverage, the present modified RANSAC process reaches the optimal solution faster, which is essential for a real-time process.

In one implementation, the present method stores in the buffer only those measurements of the range scans that belong to the estimated ground plane. This avoids the sampling of the range scan measurements from the non-ground plane elements, which need to be rejected as outliers during the RANSAC process anyway.

Instructions for carrying out the various process tasks, calculations, and generation of signals and other data used in the operation of the method and system of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented by computer executable instructions, such as program modules, which are executed by a processor. Generally, program modules include routines, programs, objects, data components, data structures, algorithms, and the like, which perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for road and obstacle detection in navigating an autonomous vehicle, the method comprising:
    scanning a distance ahead of the autonomous vehicle along only one axis to obtain a current range scan, wherein the one axis is substantially perpendicular to a direction of travel of the autonomous vehicle;
    obtaining navigation data, including dynamics, position, and orientation measurements of the autonomous vehicle, during the scanning of the distance ahead;
    transforming the current range scan to world coordinates with respect to a reference location based on the navigation data;
    inputting the transformed current range scan into a distance-based accumulator;

adding the transformed current range scan to a variable size buffer when the autonomous vehicle is deemed to be non-stationary;

estimating a ground plane from the transformed current range scan and prior range scans stored in the variable size buffer;

representing the estimated ground plane as a constrained quadratic surface; and classifying the constrained quadratic surface into one or more of a traversable area, a non-traversable area, or an obstacle area for navigation of the autonomous vehicle.

2. The method of claim 1, wherein the distance ahead is scanned by at least one laser scanner mounted on the autonomous vehicle.

3. The method of claim 2, wherein the laser scanner comprises a light detection and ranging device.

4. The method of claim 1, wherein the navigation data is obtained from at least one global positioning system sensor, and at least one inertial navigation system sensor.

5. The method of claim 1, wherein the distance-based accumulator comprises instructions for:
comparing the transformed current range scan with an immediately preceding range scan stored in the variable size buffer to determine whether the autonomous vehicle is stationary or non-stationary;
computing a distance covered by the transformed current range scan and the prior range scans stored in the variable size buffer;
comparing a fixed distance threshold with the distance covered; and
removing one or more of the prior range scans from the variable size buffer when the distance covered is greater than the fixed distance threshold.

6. The method of claim 1, further comprising running a modified RANSAC process to estimate the constrained quadratic surface.

7. The method of claim 1, wherein the estimated ground plane corresponds to a road surface on which the autonomous vehicle is traveling.

8. The method of claim 7, wherein the estimated ground plane is represented by a three-dimensional road model corresponding to the constrained quadratic surface.

9. The method of claim 1, further comprising outputting one or more map labels in world coordinates based on the transformed current range scan and the prior range scans.

10. The method of claim 9, wherein classifying the constrained quadratic surface comprises computing a height of the map labels above the estimated ground plane.

11. The method of claim 10, further comprising comparing the height of the map labels with one or more height thresholds for the traversable area, the non-traversable area, and the obstacle area.

12. A computer program product, comprising:
a computer readable medium having instructions stored thereon for a method for road and obstacle detection in navigating an autonomous vehicle, the method comprising:
scanning a distance ahead of the autonomous vehicle along only one axis to obtain a current range scan, wherein the one axis is substantially perpendicular to a direction of travel of the autonomous vehicle;
obtaining navigation data, including dynamics, position, and orientation measurements of the autonomous vehicle, during the scanning of the distance ahead;
transforming the current range scan to world coordinates with respect to a reference location based on the navigation data;
inputting the transformed current range scan into a distance-based accumulator;
adding the transformed current range scan to a variable size buffer when the autonomous vehicle is deemed to be non-stationary;
estimating a ground plane from the transformed current range scan and prior range scans stored in the variable size buffer;
representing the estimated ground plane as a constrained quadratic surface; and
classifying the constrained quadratic surface into one or more of a traversable area, a non-traversable area, or an obstacle area for navigation of the autonomous vehicle.

13. A system for road and obstacle detection in navigating an autonomous vehicle, the system comprising:
at least one laser scanner mounted on an autonomous vehicle, the laser scanner configured to perform mulitple range scans of a fixed size area ahead of the autonomous vehicle, each of the range scans occurring along only one axis, wherein the one axis is substantially perpendicular to a direction of travel of the autonomous vehicle;
a navigation unit in the autonomous vehicle, the navigation unit configured to obtain navigation data, including dynamics, position, and orientation measurements of the autonomous vehicle, during the range scans of the fixed size area; and
at least one processing unit in the autonomous vehicle and in operative communication with the laser scanner and the navigation unit, the processing unit including a variable size buffer and configured to execute instructions to:
synchronize a current range scan from the laser scanner with navigation data obtained during the current range scan;
transform the current range scan to world coordinates with respect to a reference location based on the navigation data;
input the transformed current range scan into a distance-based accumulator;
add the transformed current range scan to the variable size buffer when the autonomous vehicle is deemed to be non-stationary;
estimate a ground plane from the transformed current range scan and prior range scans stored in the variable size buffer;
represent the estimated ground plane as a constrained quadratic surface; and
classify the constrained quadratic surface into one or more of a traversable area, a non-traversable area, or an obstacle area for navigation of the autonomous vehicle.

14. The system of claim 13, wherein the at least one laser scanner comprises a light detection and ranging device.

15. The system of claim 13, wherein the navigation unit comprises one or more global positioning system sensors, and one or more inertial navigation system sensors.

16. The system of claim 13, wherein the processing unit comprises a computer, a digital signal processor, or a field programmable gate array.

17. The system of claim 13, wherein the distance-based accumulator comprises instructions to:
compare the transformed current range scan with an immediately preceding range scan stored in the variable size buffer to determine whether the autonomous vehicle is stationary or non-stationary;

compute a distance covered by the transformed current range scan and the prior range scans stored in the variable size buffer;

compare a fixed distance threshold with the distance covered; and remove one or more of the prior range scans from the variable size buffer when the distance covered is greater than the fixed distance threshold.

18. The system of claim 13, wherein the constrained quadratic surface is obtained by a modified RANSAC process.

19. The system of claim 13, wherein the ground plane is represented by a three-dimensional road model corresponding to the constrained quadratic surface.

20. The system of claim 13, wherein the constrained quadratic surface is classified by a height of one or more map labels in world coordinates above the ground plane, the map labels based on the transformed current range scan and the prior range scans.

* * * * *